(12) United States Patent
Lappos et al.

(10) Patent No.: US 12,122,507 B2
(45) Date of Patent: Oct. 22, 2024

(54) REAL TIME ROTOR HEAD MOMENT MEASUREMENT, CONTROL, AND LIMITING

(71) Applicant: LOCKHEED MARTIN CORPORATION, Bethesda, MD (US)

(72) Inventors: Nicholas D. Lappos, Beryl, UT (US); Navid Dadkhah Tehrani, Providence, RI (US); Mark Daniel Ward, Milford, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 573 days.

(21) Appl. No.: 17/354,737

(22) Filed: Jun. 22, 2021

(65) Prior Publication Data

US 2022/0402600 A1 Dec. 22, 2022

(51) Int. Cl.
| | |
|---|---|
| *B64C 27/57* | (2006.01) |
| *B64C 27/00* | (2006.01) |
| *B64C 27/08* | (2023.01) |
| *B64C 27/10* | (2023.01) |
| *G01P 5/26* | (2006.01) |
| *G01S 17/89* | (2020.01) |

(52) U.S. Cl.
CPC ............ *B64C 27/57* (2013.01); *B64C 27/008* (2013.01); *B64C 27/10* (2013.01); *G01P 5/26* (2013.01); *G01S 17/89* (2013.01)

(58) Field of Classification Search
CPC ....... B64C 27/008; B64C 27/10; B64C 27/57; G01P 5/26; G01S 17/58; G01S 17/87; G01S 17/88; G01S 17/89; G01S 7/4802
See application file for complete search history.

(56) References Cited

U.S. PATENT DOCUMENTS

| | | | | |
|---|---|---|---|---|
| 3,985,318 A | * | 10/1976 | Dominey | B64C 27/007 416/61 |
| 4,887,087 A | | 12/1989 | Clearwater | |
| 6,448,924 B1 | * | 9/2002 | Hafer, Jr. | B64C 27/008 342/28 |
| 8,190,393 B2 | | 5/2012 | Moir | |
| 9,776,731 B1 | * | 10/2017 | Lieberman | B64D 45/00 |
| 9,815,565 B1 | | 11/2017 | Fox et al. | |
| 9,823,345 B2 | * | 11/2017 | Bechhoefer | G01S 13/08 |
| 10,065,732 B2 | * | 9/2018 | Simpkins | G01J 1/0214 |
| 10,370,098 B1 | * | 8/2019 | Beckman | B64C 27/57 |
| 10,429,511 B2 | * | 10/2019 | Bosetti | G01S 17/95 |
| 2013/0089422 A1 | * | 4/2013 | Brunken, Jr. | B64C 11/32 416/23 |
| 2017/0217584 A1 | * | 8/2017 | Elfeky | B64C 27/56 |
| 2018/0148165 A1 | | 5/2018 | Geiger et al. | |
| 2018/0321386 A1 | * | 11/2018 | Bosetti | G01S 17/95 |
| 2019/0308721 A1 | * | 10/2019 | Kakaley | B64C 27/57 |
| 2022/0099067 A1 | * | 3/2022 | Packer | F03D 17/00 |

* cited by examiner

*Primary Examiner* — Tyler J Lee
(74) *Attorney, Agent, or Firm* — Foley & Lardner LLP

(57) ABSTRACT

A flight control system for a rotary-wing aircraft includes a shape sensor and a controller. The shape sensor is configured to measure a shape of a rotor blade during movement of the rotor blade. The controller is communicably coupled to the shape sensor and is configured to (i) receive, from the shape sensor, a first signal indicative of a first blade shape; (ii) receive a blade characteristic regarding the rotor blade; and (iii) determine at least one of a moment or force associated with the rotor blade based on the first signal and the blade characteristic.

20 Claims, 6 Drawing Sheets

REAL TIME ROTOR HEAD MOMENT MEASUREMENT, CONTROL, AND LIMITING

FIELD

The present disclosure relates generally to the field of rotary-wing aircraft (e.g., rotorcraft, etc.). More specifically, the present disclosure relates to a flight control system for maneuvering and control of a rotary-wing aircraft.

BACKGROUND

Rotary-wing aircraft, such as helicopters, include a rotor system having a mast, hub, and multiple rotor blades. The mast is driven into rotation using an engine to generate lift for the aircraft. Generally, rotary-wing aircraft include control systems that convert operator inputs into control parameters for the rotor system to adjust aircraft performance (e.g., to change air speed, angle of attack, and/or other flight performance characteristics). The components of the rotor system are generally designed to withstand worst-case operating conditions at full rotor blade angles, speeds, and worst case aerodynamic loads. These design constraints can increase the overall size and cost of the rotary-wing aircraft.

SUMMARY

One aspect of the present disclosure relates to a flight control system for a rotary-wing aircraft. The flight control system includes a shape sensor and a controller. The shape sensor is configured to measure a shape of a rotor blade during movement of the rotor blade. The controller is communicably coupled to the shape sensor and is configured to (i) receive, from the shape sensor, a first signal indicative of a first blade shape of the rotor blade; (ii) receive a blade characteristic regarding the rotor blade; and (iii) determine at least one of a moment or force associated with the rotor blade based on the first signal and the blade characteristic.

Another aspect of the present disclosure relates to an aircraft. The aircraft includes an airframe, a rotor system, a first shape sensor, and a controller. The rotor system is coupled to the airframe and includes a mast extending upwardly from the airframe, and a plurality of rotor blades extending radially away from the mast. The first shape sensor is coupled to the airframe and faces toward an underside of at least one blade of the plurality of rotor blades. The first shape sensor is configured to measure a first rotor blade shape of the at least one blade. The controller is communicably coupled to the first shape sensor. The controller is configured to determine at least one of a moment on the mast or a force produced by the at least one blade based on a first signal from the first shape sensor.

Yet another aspect of the present disclosure relates to an aircraft. The aircraft includes an airframe, a rotor system, an airflow sensor, and a controller. The rotor system is coupled to the airframe and includes a mast extending upwardly from the airframe, and a plurality of rotor blades extending radially away from the mast. The airflow sensor is coupled to the airframe. The airflow sensor is configured to measure an instantaneous flow condition proximate to at least one blade of the plurality of rotor blades during movement of the at least one blade. The controller is communicably coupled to the airflow sensor and is configured to determine an aerodynamic parameter proximate to the at least one blade based on a signal from the airflow sensor.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1A:
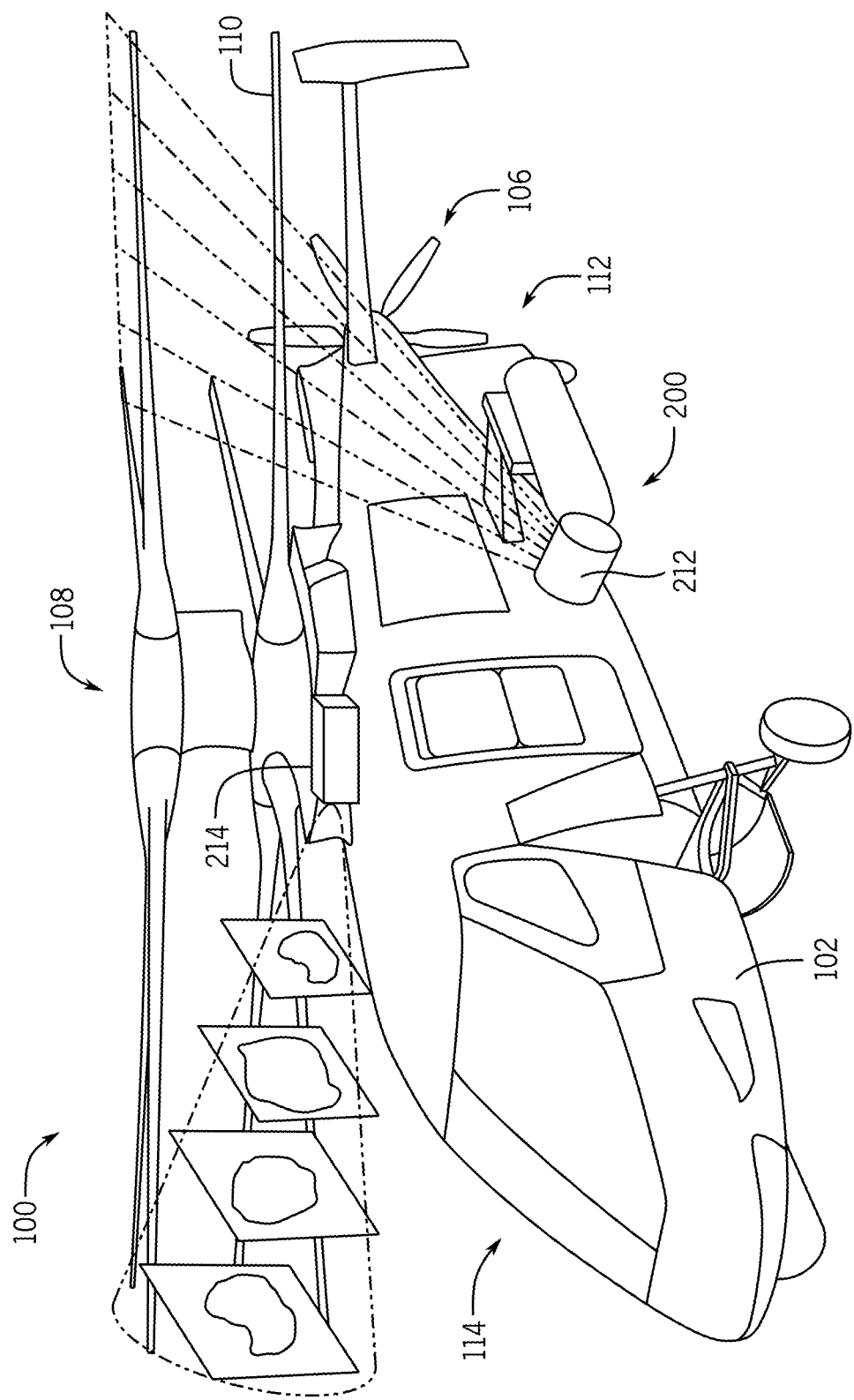
FIG. 1A is a perspective view of a rotary-wing aircraft, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The design constraints of existing helicopter designs depend on a variety of factors, including intended loads, performance requirements (e.g., maneuverability), aircraft size, rotor structure, and others. In coaxial, counter-rotating rotor helicopter designs, which have two sets of rotor blades in coaxial arrangement above the aircraft, control laws for the aircraft are generally developed to provide as much maneuverability during flight as possible. The coaxial-rotor arrangement may produce very high loads and stresses on the rotor system and, as a result, may require extremely stiff rotor blades to prevent large blade deflections (e.g., rotor tip contact at an outer edge of the rotor blades) under load. Rotor blades for coaxial-rotor helicopter designs, in particular, may produce very large head moments and hinge offsets several times what can be achieved with articulated rotor designs. As a result, the rotor systems for coaxial-rotor helicopters are generally designed for worst-case load and operating conditions that are much larger than those needed during flight maneuvers (e.g., full rotor blade angles at high speed, etc.). While these design methods reduce the likelihood of in-flight structural failures, the worst-case performance requirements result in rotor assembly components for the helicopter (e.g., rotor blade spars, rotor hub arms, rotor head, main rotor shaft and transmission mounts, etc.) that may be much heavier and more costly than articulated rotor components.

The control system of the present disclosure mitigates the aforementioned issues by determining the actual forces and moments being produced by the rotor system in real time. The control system uses this information as inputs to control operating parameters, such as rotor blade angles through the cyclic and collective controls of the aircraft (to adjust the blade angles to achieve a desired instantaneous rotor head moment and thrust), and to impose reasonable control limits to thereby reduce design constraints on the rotor system, e.g., component size, weight, and cost, while preserving the overall maneuverability of the aircraft.

In at least one embodiment, the control system includes a light detection and ranging (LIDAR) sensor that is positioned along the aircraft beneath the rotor blades and facing an underside of the rotor blades. The LIDAR sensor measures the instantaneous (e.g., real-time) blade shape (e.g., deflection, angle, etc.) while the blade is rotating and feeds this measurement back into a control unit for the control system. The control unit uses the blade shape, along with material properties for the rotor blade and/or other components of the rotor system to determine the forces and moments being generated by the rotor system. For example, the control unit may use a reference table (e.g., lookup table) and/or an algorithm that is derived based on the geometry of an unstressed blade and/or blade material properties to determine the forces on individual blades. The control unit may then combine these forces to determine an overall moment being produced by the rotor system. The control unit is configured to compare the measured forces and moments with calculated values from aircraft control laws and to adjust control inputs based on the comparison.

In some embodiments, the control system includes multiple LIDAR and/or other types of blade shape sensors. For example, the control system may include a second LIDAR sensor to measure the shape of the rotor blades as the rotor blade moves across a circular quadrant that is different from the one facing the first LIDAR sensor (e.g., on an opposite side of the aircraft as the first LIDAR sensor, etc.). The control unit may combine the information from both LIDAR sensors to obtain a more accurate measurement of the average real-time rotor blade shape during flight.

In some embodiments, the control system includes a Doppler interferometer (e.g., a laser Doppler and/or another type of airflow sensor) that is configured to measure the flow conditions around the rotor blades during movement of the rotor blades. The control unit may use the data from the Doppler interferometer to determine at least one aerodynamic parameter such as the air flow velocity in areas surrounding the rotor blades and/or the angle of the air as it flows around and in between the rotor blades. The control unit may use data from the Doppler interferometer to identify areas of flow separation along the blades. In some embodiments, the control unit may use the data from the interferometer, in combination with control laws for the aircraft and/or an empirically derived algorithm, to determine the approximate forces and moments being generated by the rotor system. In this way, the data from the Doppler interferometer may be used as a standalone alternative to the shape sensor data. In other embodiments, data from the Doppler interferometer may be used in combination with the shape sensor, to more fully define the entire air-blade system, and increase the accuracy of the force and moment measurements.

In at least one embodiment, the control unit may use the data from the Doppler interferometer to predict flow conditions around the rotor blades will change into the future. For example, the control unit may use data from the Doppler interferometer to determine how areas of flow separation along the blades are changing in size and/or how these areas are propagating along the blade. The control unit may extrapolate the state of the rotor system several milliseconds or more into the future based on these changes and/or based on precursors in the flow condition along the blade(s) that have been observed to predict the onset of flight instability. Such capabilities are particularly advantageous in emergency situations, where flow precursors and/or historical flow condition data could be used by the control unit to establish autorotative flow across the rotor blades (for emergency landings). Alternatively, or in combination, the control unit may use these predicted aerodynamic conditions to prevent the aircraft from entering autorotation and/or to limit flow separation along the rotor blades, and thereby mitigate the flight loads that need to be accommodated by the rotor system.

Among other benefits, the control unit may use the measured data from the shape and/or airflow sensors to determine how to limit the rotor blade forces to only those needed for successful maneuvering, and to values well below the maximum forces that could be created if the rotor system was driven to its full mechanical limits. By limiting the forces, the design requirements for the rotor blade spars, rotor head forgings, main rotor shaft, transmission mounts, and other components and subsystems of the rotor system can be greatly reduced.

Referring to FIG. 1A, a rotary-wing aircraft 100 is shown, according to at least one embodiment. The rotary-wing aircraft 100 is a helicopter including an airframe 102, having a main rotor system 104 extending above the airframe 102 and a tail rotor system 106 extending rearward from the airframe 102. In the embodiment of FIG. 1A, the rotary-wing aircraft 100 is a coaxial-rotor helicopter in which the main rotor system 104 includes a pair of main rotor hub assemblies 108 stacked vertically on concentrically-arranged drive shafts (e.g., coaxial drive shafts). Together, the drive shafts form a mast of the main rotor system 104 that extends vertically above the airframe 102. In other embodiments, the rotary-wing aircraft may be a single-rotor helicopter that includes only a single main rotor hub assembly 108 and a single driveshaft. In yet other embodiments, the rotary-wing aircraft may be a gyrocopter, gyrodyne, or another form of rotorcraft.

As shown in FIG. 1A, each main rotor hub assembly 108 couples a plurality of rotor blades 110 to a respective one of the concentric drive shafts. The rotor blades 110 extend radially away from a respective one of the main rotor hub assemblies 108. Each main rotor hub assembly 108 may include (in addition to the drive shaft) a main bearing, a plurality of pitch links and pitch bearings corresponding to each of the rotor blades 110, and a swashplate (e.g., rotor disk, etc.) that translates input via the helicopter flight controls into motion of the rotor blades 110 (e.g., through the pitch links and pitch bearings). The rotary-wing aircraft 100 also includes a prime mover (e.g., turbine engine, etc.) that drives rotation of the main rotor hub assemblies 108 and rotor blades 110 via the drive shafts.

Figure 2:
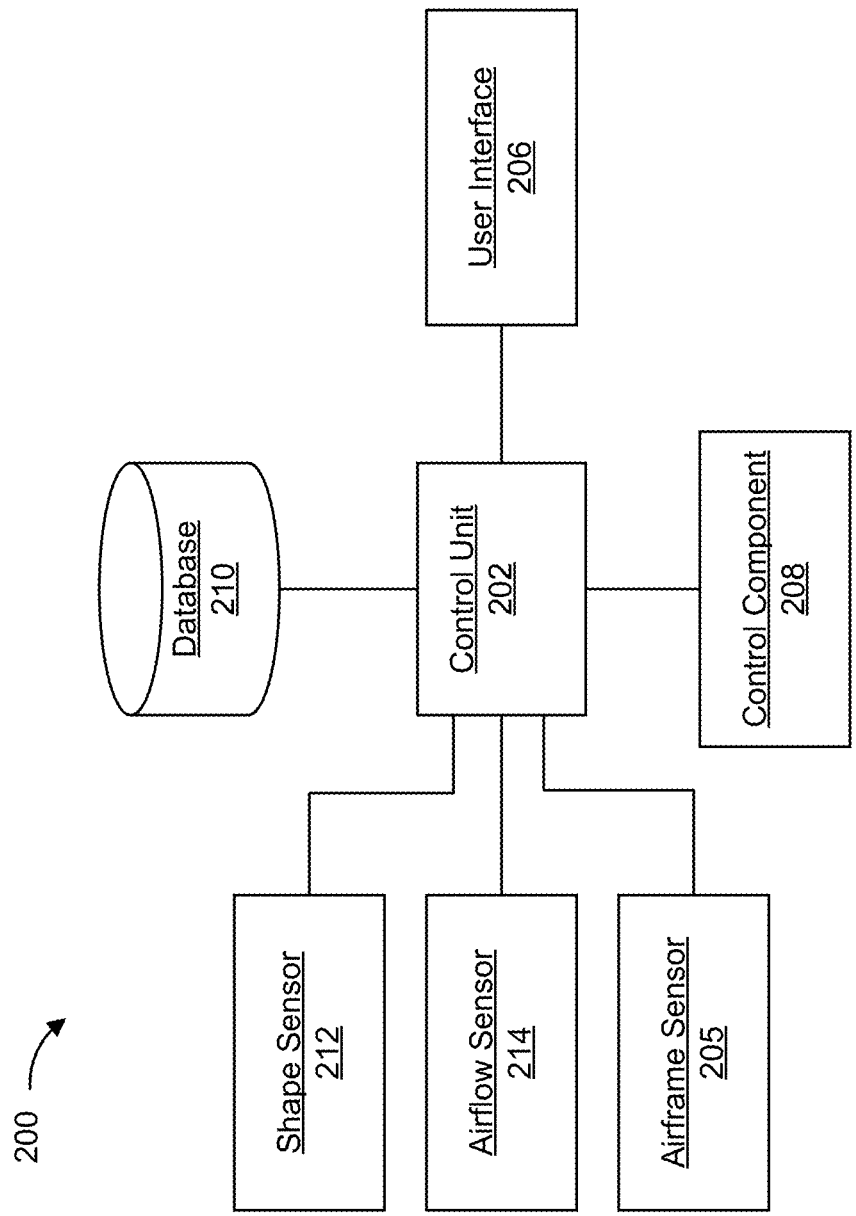
FIG. 2 is a block diagram of a control system for a rotary-wing aircraft, according to an embodiment.

As shown in FIG. 1A, the rotary-wing aircraft 100 also includes a control system 200 that is configured to monitor flight performance, receive operator commands, and control operation of both the main rotor system 104 and the tail rotor system 106. Referring to FIG. 2, a block diagram of the control system 200 for the rotary-wing aircraft 100 is shown, according to at least one embodiment. The control system 200 includes a control unit 202, a plurality of rotor sensors 204, at least one airframe sensor 205 (e.g., a pressure sensor, temperature sensor, etc.), a user interface 206, a plurality of control components 208, and a database 210. In other embodiments, the control system may include additional, fewer, and/or different components.

The control unit 202 (e.g., controller, control circuit, etc.) is configured to communicate with and coordinate operations between each of the rotor sensors 204, the airframe sensor(s), the user interface 206, and the control component 208. The control unit 202 may include a non-transitory computer readable medium or processor, having computer-readable instructions stored thereon that when executed cause the at least one control unit to carry out operations called for by the instructions. The control unit 202 may include a power source, a memory (e.g., database 210), a communications interface (e.g., an input/output (I/O) interface, a network interface, a transceiver, etc.), and a processor.

In at least one embodiment, the control unit 202 may be a computing device onboard the rotary-wing aircraft 100 (see FIG. 1A). In other embodiments, at least part of the control unit 202 may include a data cloud (e.g., server, etc.) that is located remotely from the rotary-wing aircraft 100. In some embodiments, the control unit 202 includes at least one circuit for controlling different flight operations. For example, the control unit 202 may include a blade shape circuit configured to determine the shape/geometry of the rotor blades 110 based on data from the rotor sensors 204, and an airflow condition circuit configured to determine aerodynamic conditions along the rotor blades from the rotor sensors 204. In other embodiments, the control unit 202 may include additional, fewer, and/or different components.

Figure 3:
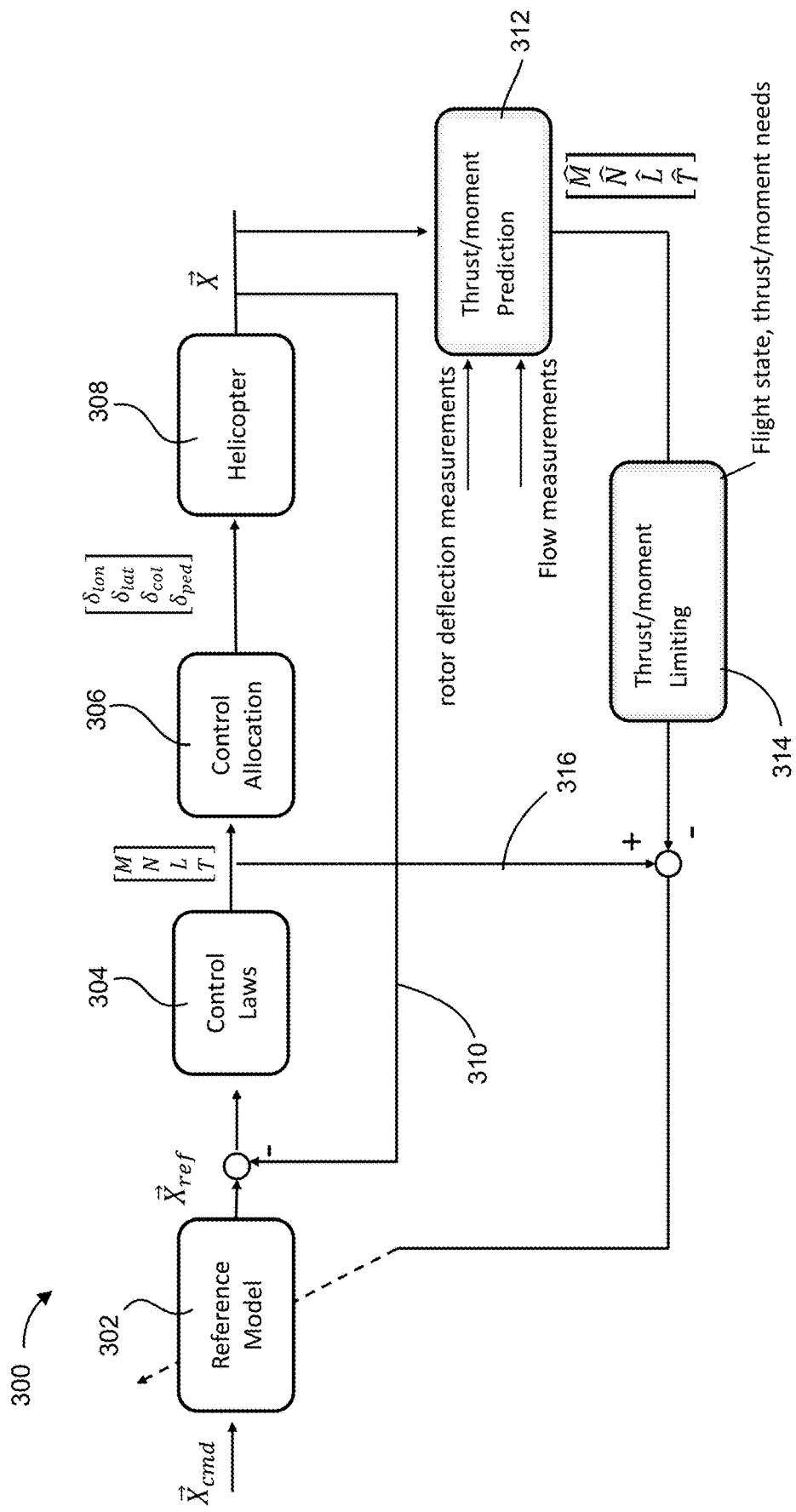
FIG. 3 is a schematic diagram of a control structure for a rotary-wing aircraft that includes a shape sensor and an airflow sensor, according to an embodiment.

As shown in FIG. 3, the control unit 202 is communicably coupled (e.g., electrically or wirelessly connected, etc.) to a plurality of different types of rotor sensors 204, including at least one shape sensor 212 and at least one airflow sensor 214. In other embodiments, the control system 200 may only include a single type of rotor sensor 204 (e.g., the shape sensor 212 independent from the airflow sensor 214 as a standalone rotor sensor, or vice versa). The shape sensor 212 is configured to measure a shape of at least one rotor blade 110 during rotation of the rotor blade 110 (see FIG. 1A). The shape may include an instantaneous geometry of the rotor blade 110, a blade bending mode shape, a flapping angle, a tip clearance (e.g., a tip-to-tip clearance between adjacent sets of rotor blades 110 along an axial direction, parallel to the rotational axis of the main rotor system 104), axial deflection at the tip of the rotor blades 110 from a neutral position, and/or other real-time structural conditions of the rotor blades 110.

In the embodiment of FIG. 1A, the shape sensor 212 is positioned along the airframe 102 to have clear visibility of the rotor blade 110 as it rotates above the airframe 102. As shown in FIG. 1A, the shape sensor 212 is a blade shape transducer coupled to the airframe 102 along a first side 112 (e.g., left side as shown in FIG. 1A) of the airframe 102 that "shines" upwardly toward an underside of the rotor blade 110. The shape sensor 212 is disposed beneath the rotor blades 110 at an intermediate position along the first side 112 (e.g., between a forward and rear end of the airframe 102). The shape sensor 212 extends away from the airframe 102 and is oriented to face the underside (e.g., a bottom surface) of the rotor blades 110. In other embodiments, the rotor sensors 204 may include multiple shape sensors 212 positioned at different locations around the airframe 102.

For example, the rotor sensors 204 may include a second shape sensor positioned on a second side 114 of the airframe 102 (e.g., right side as shown in FIG. 1A) opposite from the first side 112 and measuring blade shape over a second circular quadrant of the blade. In at least one embodiment, the shape sensor 212 includes a light detection and ranging (LIDAR) sensor, which, among other benefits, provides accurate measurements of blade shape during movement of the rotor blades without requiring strain gauges and/or other sensitive measurement devices that would require means for signal transmission from the rotating components.

Figure 1B:
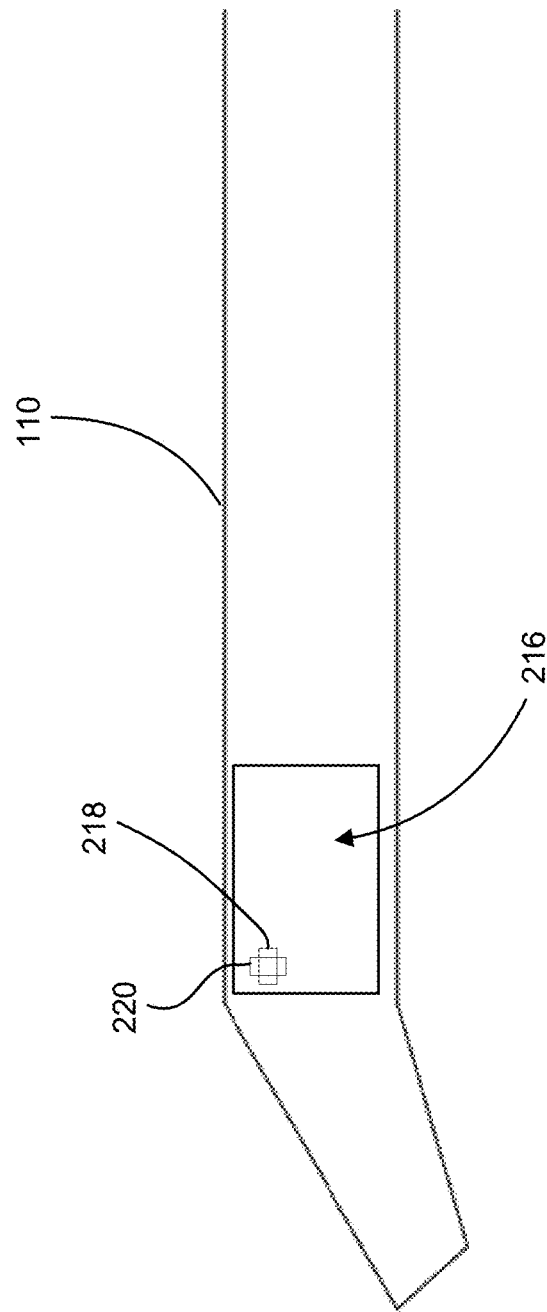
FIG. 1B is a bottom view of a rotor blade that includes a mat of strain gauges, according to an embodiment.

In other embodiments, the shape sensor 212 may include another form of blade shape monitoring device. For example, the shape sensor may include at least one strain gauge, or a plurality of strain gauges positioned disposed on the blade (e.g., coupled to a surface of the blade, etc.). In at least one embodiment, as shown in FIG. 1B, the shape sensor includes a two-dimensional (2D) mat 216 of strain gauges that is coupled to the rotor blade (e.g., proximate a tip of the rotor blade, or another suitable position along the blade). The strain gauges are arranged (e.g., arrayed) in a matrix across the mat 216. Each data point from the mat 216 includes two strain gauges including a first strain gauge 218 and a second strain gauge 220 arranged orthogonally with respect to the first strain gauge 218 (e.g., substantially perpendicular to the first strain gauge 218, in an X-direction and Y-direction along the rotor blade, etc.). The number and/or arrangement of strain gauges along the mat may be different in various embodiments. Together, the strain gauges from the mat 216 return an array of vectors from a 2D plane along the rotor blade that can be used to determine the three-dimensional (3D) bending of the surface of the rotor blade. In other embodiments, yet another form of shape sensor 212 may be used to measure the approximate real-time shape of the rotor blade.

The airflow sensor 214 is configured to measure a flow condition proximate to the rotor blade 110 during movement of the rotor blade 110. For example, the airflow sensor 214 may be configured to measure flow velocities (three axis airspeed, etc.) near the rotor blade 110 and/or flow angles of the air passing through the rotor blades 110. The control unit 202 may be configured to determine various aerodynamic parameters based on the measured flow conditions, such as the establishment of autorotative flow, stall conditions, and the approximate forces and moments required to generate the measured flow conditions.

The airflow sensor 214 is positioned along the airframe 102 to have clear visibility of the rotor blades 110 and/or areas in between adjacent sets of rotor blades 110. As shown in FIG. 1A, the airflow sensor 214 is an airflow transducer coupled to a roof of the airframe 102 at an approximately central position and facing radially away from the rotational axis of the main rotor system 104, toward the rotor blades 110. The airflow sensor 214 may be positioned to face outward from the airframe 102 toward a right or left side of the airframe 102 to obtain the most accurate measurements of the average flow conditions for the rotor system. In other embodiments, the airflow sensor 214 may be positioned to face forward or rearward of the airframe 102, or at another suitable rotational position. In at least one embodiment, the airflow sensor 214 is a laser Doppler measurement system (e.g., a laser Doppler velocimeter, a Doppler LIDAR, etc.). In other embodiments, the shape sensor 212 may include another form of airflow sensor.

The user interface 206 is communicably coupled to the control unit 202 and is configured to output information from the rotor sensors 204. The user interface 206 is also configured to receive control inputs from the operator (e.g., flight commands, collective control, pitch control, throttle control, antitorque control, cyclic pitch control, etc.). In various embodiments, the user interface 206 includes a graphical user interface (e.g., a monitor, display, etc.). In some embodiments, the user interface 206 includes at least one component that is responsive to user inputs such as, but not limited to, at least one touch-sensitive region (e.g., touch-sensitive display), buttons, audio inputs such as microphones, levers, and/or knobs.

The control components 208 include at least one servo system that is connected to and controls various parts of the main rotor system 104 and the tail rotor system 106 (see FIG. 1A). The control components 208 may be configured to control pitching of the rotor blades 110, elevator pitching, rotor speed, and/or other control parameters in response to control inputs from the user interface 206.

The database 210 includes a non-transitory readable medium for the control system 200. In some embodiments, the database 210 is integrated with the control unit 202. The database 210 stores various control parameters and algorithms for the control system 200 including control laws for the rotary-wing aircraft 100 that are used to generate commands (e.g., servo commands) for moving the control components 208 of the rotary-wing aircraft 100. In at least one embodiment, the database 210 stores blade characteristics of the rotor blades 110. The blade characteristics may include mechanical properties of the rotor blades 110 such as one or more material properties, neutral geometry of the rotor blades 110 in an unloaded condition, rotor blade size, stiffness, moment tables, and/or other parameters characterizing the design of the rotor blades 110. These blade characteristics may be determined through experimentation with the rotor blades 110 (e.g., flight simulation), structural models (e.g., finite element analysis, etc.) that predict how the blade shape will change under certain loading and/or aerodynamic conditions, and/or other structural algorithms. In at least one embodiment, the database 210 also stores threshold moments and/or threshold forces that are associated with components of the main rotor system 104 (e.g., rotor blades 110). The threshold moments and/or forces may be indicative of the desired operating limits for the rotor blades 110. In combination with the blade shape and/or airflow measurements, the threshold moments and/or forces serve to limit control commands that may be issued by the control unit 202 to the control components 208.

Referring to FIG. 3, a flight control schematic 300 for a rotary-wing aircraft that includes shape and airflow sensors is shown, according to at least one embodiment. The control schematic 300 illustrates at least one method of controlling the rotary-wing aircraft in response to user inputs (e.g., via user interface 206). The control method of FIG. 3 may be implemented with the control system 200 of FIG. 2. As such, the method will be described with regard to FIG. 2.

At 302, the control unit (e.g., control unit 202) receives an input command from the user interface (e.g., user interface 206). The input command may include a request to increase airspeed, adjust the pitch of the airframe, and/or another type of input command for maneuvering the rotary-wing aircraft. At 304, the control unit determines the approximate loads (e.g., thrusts, forces, moments, etc.) required to achieve the desired performance. Operation 304 may include calculating the approximate loads from control laws that characterize the rotary-wing aircraft. At 306, the control unit determines the commands to issue to the control components (e.g., control components 208) in order to achieve the approximated loads. Operation 306 may include determining a control command to be issued to at least one control component (e.g., collective control command, cyclic control command, thrust command, etc.), and issuing the control command by transmitting a corresponding signal to the at least one control component.

At 308, the control unit 202 receives sensor data from at least one aircraft sensor (e.g., airframe sensor 205), and determines at least one operating state of the rotary-wing aircraft (e.g., aircraft performance) based on the sensor data. For example, operation 308 may include receiving air pressure measurements from one or more pressure sensors on the aircraft and determining the airspeed of the rotary-wing aircraft based on the pressure measurements. In other embodiments, operation 308 may include determining a position (e.g., altitude), attitude, and/or another operating state of the rotary-wing aircraft. As shown in FIG. 3, the method further includes comparing this aircraft performance information to operator inputs via feedback loop 310 and iterating back through operations 304-308 to correct for any deviations from the desired operation.

The control system 200 (FIG. 2) of the present disclosure augments operations 302-308 by determining the actual forces and moments being produced by the rotor system in real-time. The control system 200 uses this information as inputs to control operating parameters for the rotary-wing aircraft, instead of relying on only the bulk aircraft performance indicators (e.g., aircraft speed, altitude, and attitude) for this purpose. As shown in FIG. 3, the control schematic 300 includes a thrust/moments prediction block 312 and a thrust/moment limiting block 314. As will be further described, at the thrust/moments prediction block 312, the control unit uses sensor data from the rotor sensors (e.g., blade shape sensor(s) 212, airflow sensor(s) 214) to determine the actual forces and moments being produced by the main rotor system 104 (e.g., rotor blades 110).

In some embodiments, the thrust/moments prediction block 312 also uses the data from the rotor sensors and, in particular, the airflow sensor(s) 214 to predict the likely forces and moments that will occur into the future. These measured and/or predicted forces and moments are fed back into the thrust/moment limiting block 314, where the control system compares the measured and/or predicted forces and moments to threshold values stored in the database (e.g., database 210). These threshold values (e.g., a threshold moment or threshold force) may be indicative of load limits for the rotor blades and/or other components of the main rotor system 104 (see FIG. 1A). For example, the threshold values may be determined based on design safety factors for components of the main rotor system 104 (e.g., a fraction of the maximum design strain for the rotor blades, a minimum allowable tip clearance between adjacent sets of rotor blades determined based on the material properties and geometry of the rotor blades, etc.). In the event that the measured and/or predicted forces and moments satisfy the threshold values, the control unit will adjust the reference model (e.g., at 302) to maintain operation within desired performance limits. The resulting forces and moments are then continuously compared to the output of operation 314, via feedback loop 316, and an adjustment to the control outputs is made (at operation 306) based on the comparison.

Figure 4:
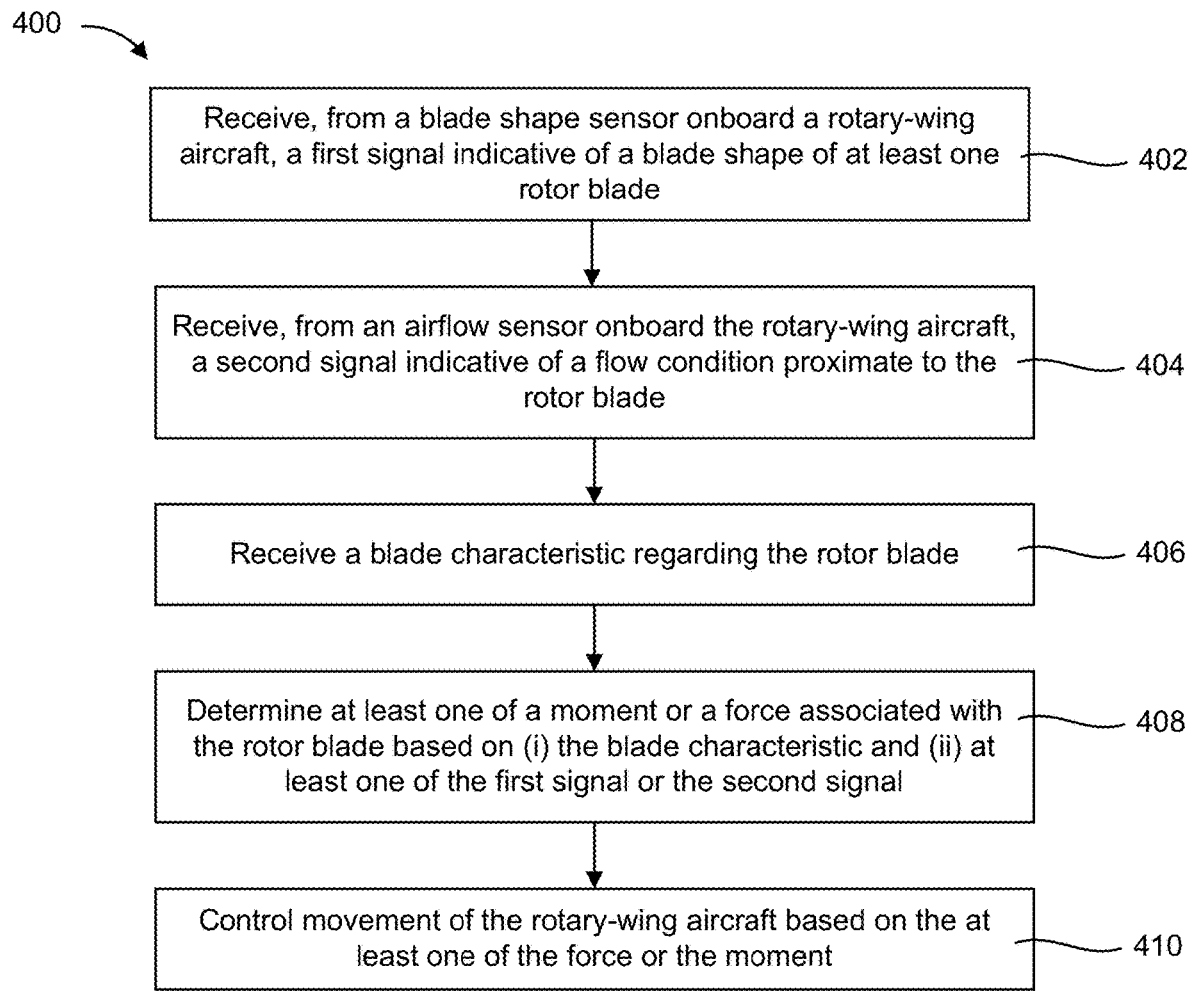
FIG. 4 is a flow diagram of a method of rotor system load measurement and control, according to an embodiment.

Referring to FIG. 4, a flow diagram of a method 400 of rotor system load measurement and control is shown, according to at least one embodiment. As described above, the method 400 may be implemented with the control system 200 of FIG. 2 and may therefore be described with regard to FIG. 2.

At 402, the control unit (e.g., control unit 202, controller, control circuit, etc.) receives, from a blade shape sensor (e.g., shape sensor 212) a first signal indicative of a first blade shape of at least one rotor blade. Operation 402 may include receiving a voltage or another form of input signal from a LIDAR sensor indicative of a shape of a lower surface of the at least one rotor blade, an amount of axial deflection at a tip of the at least one rotor blade, a rotor blade angle, and/or another geometric parameter indicative of the deflection of the rotor blade (from a neutral position and/or shape of the rotor blade). For example, operation 402 may include receiving a LIDAR point cloud and/or a plurality of data points from the LIDAR sensor that represent blade surface position and/or an amount of blade deflection at different points across the surface of the rotor blade. Operation 402 may further include calculating the blade shape via point cloud processing of the LIDAR point cloud. In some embodiments, operation 402 may further include determining the blade shape based on the first signal from the blade shape sensor, for example, by using a calibration equation or by looping through a lookup table stored in the database (e.g., database 210) of the control system.

In some embodiments, method 400 further includes receiving, from a second shape sensor onboard the rotary-wing aircraft, a second shape signal indicative of a second blade shape of the at least one rotor blade (e.g., a shape of the at least one rotor blade as it moves across a second circular quadrant above the airframe). In such an implementation, operation 402 may further include combining the second shape signal with the first signal to determine an average blade shape of the rotor blade. For example, operation 402 may include averaging the second shape signal and the first signal directly, and/or applying a weighting factor to at least one of the first signal and the second shape signal based on the relative positioning of the first and second shape sensors and/or visibility of the rotor blades.

At 404, the control unit receives, from an airflow sensor (e.g., airflow sensor 214) a second signal indicative of a flow condition proximate to the rotor blade. Operation 404 may include receiving a voltage signal or another form input signal from a laser Doppler velocimeter indicative of a flow condition along the rotor blades. Operation 404 may further include determining an aerodynamic parameter proximate to the at least one rotor blade from the second signal. The aerodynamic parameter may include an airflow velocity in different viewing areas for the airflow sensor, flow angles, and/or other aerodynamic parameters. In some embodiments, operation 404 may further include determining the aerodynamic parameter based on the second signal from the airflow sensor, for example, by using a conversion equation or by looping through a lookup table stored in the database (e.g., database 210) of the control system.

At 406, the control unit receives a blade characteristic regarding at least one rotor blade and/or another component of the main rotor system (e.g., drive shaft, main rotor hub, etc.). The blade characteristic may include material properties for a component of the main rotor system (e.g., rotor blades, etc.), a geometry of the component (e.g., a neutral geometry of the blades, blade thickness, blade shape in the neutral position, blade length, etc.), and/or other structural properties associated with the component. In some embodiments, operation 406 may include accessing a reference table (e.g., lookup table) from the database that includes a list of forces corresponding with different shapes of the rotor blade and/or another component of the main rotor system. In some embodiments, operation 406 includes accessing algorithms such as predefined algorithms from experimental testing, simulation, or known physical relationships that relate blade shape to the loads and stresses on at least one component of the main rotor system.

At 408, the control unit determines a moment and/or a force that is associated with at least one component of the main rotor system. For example, operation 408 may include determining a force being produced by a rotor blade based on (i) the blade characteristic and (2) the first signal from the shape sensor and/or the second signal from the airflow sensor. Operation 408 may include looping through the lookup table (described in operation 406) to identify the force that corresponds with the measured blade shape and/or the measured aerodynamic parameter. In other embodiments, operation 408 may include calculating the force corresponding with the measured blade shape and/or aerodynamic parameter using the algorithms stored in the database.

In some embodiments, operation 408 further includes determining bulk forces and/or moments on the rotor system based on the forced being produced by the individual rotor blades. For example, operation 408 may include summing the forces produced by each one of the individual rotor blades to determine a net force acting on the rotor system. Operation 408 may also include computing the moments on the rotor head (e.g., drive shafts) based on the forces generated by individual rotor blades and their geometry.

At 410, the control unit controls movement of the rotary-wing aircraft based on the forces and/or moments determined in operation 408. Operation 410 may include comparing the measured forces and/or moments to those calculated using control laws for the rotary-wing aircraft, and adjusting control commands based on differences between these two values. Operation 410 may also include transmitting the control commands (e.g., signals, etc.) to the control equipment to adjust rotor blade angles and other control parameters. For example, operation 410 may include transmitting a signal to a servo motor and/or actuator that controls a position of the swashplate for the rotary-wing aircraft. In some embodiments, operation 410 may further include limiting the control commands based on threshold forces and/or threshold moments stored in the database. For example, in the event that the measured forces and/or moments satisfy the threshold values (e.g., are greater than, equal to, or within a suitable range of the threshold values), the control unit may be configured to reduce and/or limit the control commands to substantially prevent the rotary-wing aircraft from operating outside of desired performance limits for the main rotor system.

Figure 5:
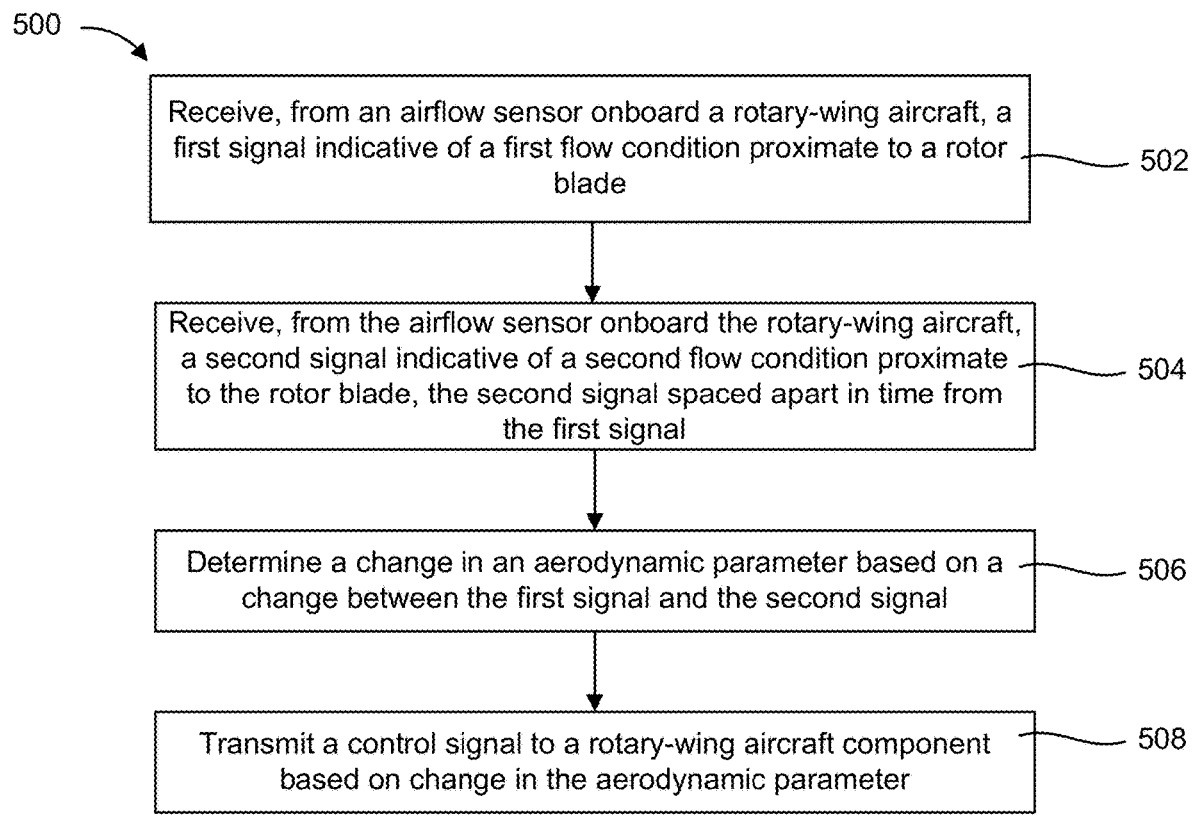
FIG. 5 is a flow diagram of a method of predicting a change in aerodynamic performance of a rotary-wing aircraft, according to an embodiment.

In some embodiments, the control system is further configured to predict the aerodynamic force and structural loads on the main rotor system using data from the rotor sensors (e.g., rotor sensors 204 from FIG. 2). Referring to FIG. 5, a flow diagram of a method 500 of predicting a change in aerodynamic performance of a rotary-wing aircraft is shown, according to an embodiment.

At 502, the control unit (e.g., control unit 202 of FIG. 2, controller, control circuit, etc.) receives, from an airflow sensor, a first signal indicative of a first flow condition proximate to a rotor blade of a rotary-wing aircraft. Operation 502 may be similar to or substantially the same as operation 404 of method 400. In at least one embodiment, the first flow condition is a historical flow condition that was measured in a previous time, for example, a few milliseconds or another suitable sampling interval into the past (e.g., prior to the real-time flow condition). At 504, the control unit receives, from the airflow sensor a second signal indicative of a second flow condition proximate to the rotor blade that is spaced apart in time from the first flow condition. In at least one embodiment, the second flow condition is indicative of an instantaneous (e.g., real time, current, etc.) flow condition at the rotor blade. In some embodiments, operation 502 and/or 504 may further include determining an aerodynamic parameter from the first signal and the second signal, for example, by using a calibration equation, a reference table stored in the database, an algorithm that determines the air velocity and angles of the airflow or via another suitable data conversion method.

At 506, the control unit determines a change in an aerodynamic parameter based on a change between the first signal and the second signal. Operation 506 may include calculating a rate of change of the aerodynamic parameter between the two distinct time intervals. For example, operation 506 may include determining a rate of change in an amount of flow separation at the rotor blade over a sampling interval between the first signal and the second signal. In some embodiments, operation 506 may further include predicting stall conditions and/or autorotative flow conditions for the rotor system at least a few milliseconds into the future (e.g., the next few hundred milliseconds, etc.).

At 508, the control unit transmits a control command (e.g., signal, etc.) to at least one control component for the rotary-wing aircraft. Operation 508 may be similar to or substantially the same as operation 410 from method 400 (see FIG. 4). In some embodiments, operation 508 includes transmitting a notification to an operator (e.g., via user interface 206) that indicates that certain aerodynamic conditions have been detected. For example, the control unit may be configured to report a stall warning to the operator in response to the change in the aerodynamic parameter (e.g., change in airflow conditions at the rotor blade) and/or a predicted change in the aerodynamic parameter. In some embodiments, the control unit may also be configured to automatically transmit a control signal to the control component to prevent the onset of stall and/or other undesirable flow conditions.

In emergency situations, the control unit may be configured to control the rotor system to establish and/or initiate autorotative flow conditions for the rotary-wing aircraft. For example, in the event of engine failure, the control unit may be configured to control the rotor system based on the airflow sensor measurements, to position the rotary-wing aircraft so as to establish autorotative flight conditions as quickly as possible, and to increase the amount of time that the pilot or operator has to identify and travel to a suitable landing area.

It will be appreciated that the predictive method described with reference to FIG. 5 may also be applied using the blade sensor data from the blade shape sensors. For example, the control unit may be configured to compare instantaneous blade shape data with historical blade shape data to predict how the forces on the rotor blades may change into the future. In yet other embodiments, the instantaneous flow condition at the rotor blades may be an indicator of how the flow condition may change into the future (e.g., the instantaneous flow condition indicates the onset of stall or autorotative flow at the rotor blades). In such an implementation, the control unit may be configured to predict the change in the forces and/or moments from a single value of the flow condition at the rotor blades.

Notwithstanding the embodiments described above in reference to FIGS. 1A—5, various modifications and inclusions to those embodiments are contemplated and considered within the scope of the present disclosure.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. The systems and methods described herein may be embodied in other specific forms without departing from the characteristics thereof. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A flight control system, comprising:
    a shape sensor configured to measure a shape of a rotor blade during movement of the rotor blade; and
    a controller communicably coupled to the shape sensor and configured to:
        receive, from the shape sensor, a first signal indicative of a first blade shape of the rotor blade;
        receive a blade characteristic including a mechanical property relating to a rotor blade material of the rotor blade; and
        determine at least one of a moment or a force associated with the rotor blade based on the first signal and the blade characteristic.

2. The flight control system of claim 1, wherein the shape sensor is a light detection and ranging (LIDAR) sensor.

3. The flight control system of claim 1, wherein the shape sensor is configured to measure an amount of axial deflection at a tip of the rotor blade.

4. The flight control system of claim 1, wherein the shape sensor is mountable to a rotary-wing aircraft at a position below the rotor blade, wherein the shape sensor is configured to be oriented toward an underside of the rotor blade.

5. The flight control system of claim 1, wherein the blade characteristic is a material property of the rotor blade material.

6. The flight control system of claim 1, wherein receiving the blade characteristic comprises accessing a lookup table including a list of forces corresponding with different shapes of the rotor blade, and wherein determining at least one of the moment or the force associated with the rotor blade comprises iterating through the lookup table to identify the at least one of the moment or the force that corresponds with the first blade shape.

7. The flight control system of claim 1, further comprising an airflow sensor configured to measure a flow condition proximate to the rotor blade during movement of the rotor blade, wherein the controller is communicably coupled to the airflow sensor, and wherein the controller is further configured to:
    receive, from the airflow sensor, a third signal indicative of the flow condition proximate to the rotor blade; and
    determine an aerodynamic parameter proximate to the rotor blade from the third signal.

8. The flight control system of claim 7, wherein the controller is further configured to predict a change in the aerodynamic parameter based on the third signal.

9. The flight control system of claim 7, wherein the airflow sensor includes a laser Doppler velocimeter.

10. The flight control system of claim 1, further comprising an output configured to transmit a control signal to an controlled aircraft component, wherein the controller is further configured to limit the control signal based on at least one of a threshold moment or threshold force associated with the rotor blade.

11. A flight control system, comprising:
    a first shape sensor configured to measure a shape of a rotor blade during movement of the rotor blade;
    a second shape sensor configured to measure the shape of the rotor blade during movement of the rotor blade; and
    a controller communicably coupled to the first shape sensor and the second shape sensor, the controller configured to:
        receive, from the first shape sensor, a first signal indicative of a first blade shape of the rotor blade;
        receive, from the second shape sensor, a second signal indicative of a second blade shape of the rotor blade;
        combine the first signal with the second signal to determine an average blade shape;
        receive a blade characteristic relating to the rotor blade; and
        determine the at least one of a moment or a force associated with the rotor blade based on the average blade shape and the blade characteristic.

12. An aircraft, comprising:
    an airframe;
    a rotor system coupled to the airframe, the rotor system including a mast extending upwardly from the airframe, and a plurality of rotor blades extending radially away from the mast;
    a first shape sensor coupled to the airframe and facing toward an underside of at least one blade of the plurality of rotor blades, the first shape sensor configured to measure a first rotor blade shape of the at least one blade; and
    a controller communicably coupled to the first shape sensor, the controller configured to:
        receive a blade characteristic including a mechanical property relating to a rotor blade material of the at least one blade; and determine at least one of a moment or a force associated with the at least one blade based on a first signal from the first shape sensor and the blade characteristic.

13. The aircraft of claim 12, further comprising an airflow sensor coupled to the airframe, wherein the airflow sensor is configured to measure a flow condition proximate to the at least one blade during movement of the at least one blade, and wherein the controller is further configured to determine an aerodynamic parameter proximate to the at least one blade based on a third signal from the airflow sensor.

14. The aircraft of claim 13, wherein the controller is further configured to predict a change in the aerodynamic parameter based on the third signal.

15. The aircraft of claim 12, further comprising a control component communicably coupled to the rotor system and the controller, wherein the control component is configured to drive movement of at least part of the rotor system, and wherein the controller is configured to limit a control signal to the control component based on at least one of a threshold moment or a threshold force associated with the at least one blade.

16. An aircraft, comprising:
an airframe;
a rotor system coupled to the airframe, the rotor system including a mast extending upwardly from the airframe, and a plurality of rotor blades extending radially from the mast;
a first shape sensor coupled to the airframe and facing toward an underside of at least one blade of the plurality of rotor blades, the first shape sensor configured to measure a first rotor blade shape of the at least one blade;
a second shape sensor coupled to a second side of the airframe opposite the first side, the second shape sensor configured to measure a second blade shape of the at least one blade; and
a controller communicably coupled to the first shape sensor and the second shape sensor, the controller configured to determine at least one of a moment on the mast or a force associated with the at least one blade based on a first signal from the first shape sensor and a second signal from the second shape sensor.

17. An aircraft, comprising:
an airframe;
a rotor system coupled to the airframe, the rotor system including a mast extending upwardly from the airframe, and a plurality of rotor blades extending radially from the mast;
an airflow sensor coupled to the airframe and configured to measure an instantaneous flow condition proximate to at least one blade of the plurality of rotor blades during movement of the at least one blade; and
a controller communicably coupled to the airflow sensor, the controller configured to:
receive a blade characteristic including a material property relating to a rotor blade material of the at least one blade;
determine an aerodynamic parameter proximate to the at least one blade based on a signal from the airflow sensor; and
determine at least one of a moment or a force associated with the at least one blade based on the aerodynamic parameter and the blade characteristic.

18. The aircraft of claim 17, wherein the controller is further configured to predict a change in the aerodynamic parameter based on the signal.

19. The aircraft of claim 17, wherein the controller is configured to determine at least one of the moment or the force associated with the at least one blade based on the signal.

20. The aircraft of claim 17, further comprising a control component communicably coupled to the rotor system and the controller, wherein the control component is configured drive movement of at least part of the rotor system, and wherein the controller is configured to limit a control signal to the control component based on at least one of a threshold moment or a threshold force associated with the at least one blade.

* * * * *